United States Patent [19]

Hatcher

[11] Patent Number: 5,570,756

[45] Date of Patent: Nov. 5, 1996

[54] ANTI-THEFT SYSTEM FOR IMMOBILIZING A VEHICLE

[75] Inventor: Jonathan P. Hatcher, Dearing, Ga.

[73] Assignee: Blatstek, Augusta, Ga.

[21] Appl. No.: 493,844

[22] Filed: Jun. 22, 1995

[51] Int. Cl.$^6$ .................................................. B60R 25/08
[52] U.S. Cl. ............................. 180/287; 188/353; 303/53
[58] Field of Search ............................. 180/287; 188/353, 188/265; 303/53

[56] References Cited

U.S. PATENT DOCUMENTS

| | | | |
|---|---|---|---|
| 3,684,049 | 8/1972 | Kimura | 180/103 |
| 3,800,279 | 3/1974 | Thompson | 340/65 |
| 4,018,314 | 4/1977 | Richmond et al. | 188/353 |
| 4,196,939 | 4/1980 | Kavis | 303/89 |
| 4,300,057 | 11/1981 | Batlle Crosas | 307/10 AT |
| 4,546,846 | 10/1985 | Myers | 180/287 |
| 4,777,377 | 10/1988 | Jeter | 307/10 AT |
| 4,951,776 | 8/1990 | Jeter | 180/287 |
| 5,078,456 | 1/1992 | Cox | 180/287 |
| 5,351,781 | 10/1994 | Pritchard et al. | 180/287 |
| 5,399,002 | 3/1995 | Taylor | 180/287 |
| 5,413,197 | 5/1995 | Baer et al. | 188/353 |

FOREIGN PATENT DOCUMENTS 62-80147  4/1987  Japan ..................................... 188/353

*Primary Examiner*—Karin L. Tyson
*Attorney, Agent, or Firm*—Nies, Kurz, Bergert & Tamburro

[57] ABSTRACT

A vehicle security system for immobilizing a vehicle to prevent theft and other unauthorized movement of the vehicle. The system includes a brake blocking valve for selectively preventing fluid communication between the vehicle wheel brake cylinders and the vehicle brake master cylinder. The brake blocking valve is activated after the vehicle is brought to a stop, the service brakes are applied, and either an activation pushbutton is pressed to engage the system while the engine is running, or, alternatively, the system is automatically activated by turning off the ignition switch while foot pressure is maintained on the service brake. In addition to blocking vehicle movement by locking the service brakes in the brake engaged condition, the system also disables the starter by opening the starter circuit, and it disables the ignition coil by opening the ignition circuit, thereby further deterring and preventing unintended vehicle movement. Deactivation of the system is effected by entering a deactivation code into a numerical keypad mounted on the vehicle dashboard. The deactivation code is known only to an authorized user of the vehicle.

18 Claims, 4 Drawing Sheets

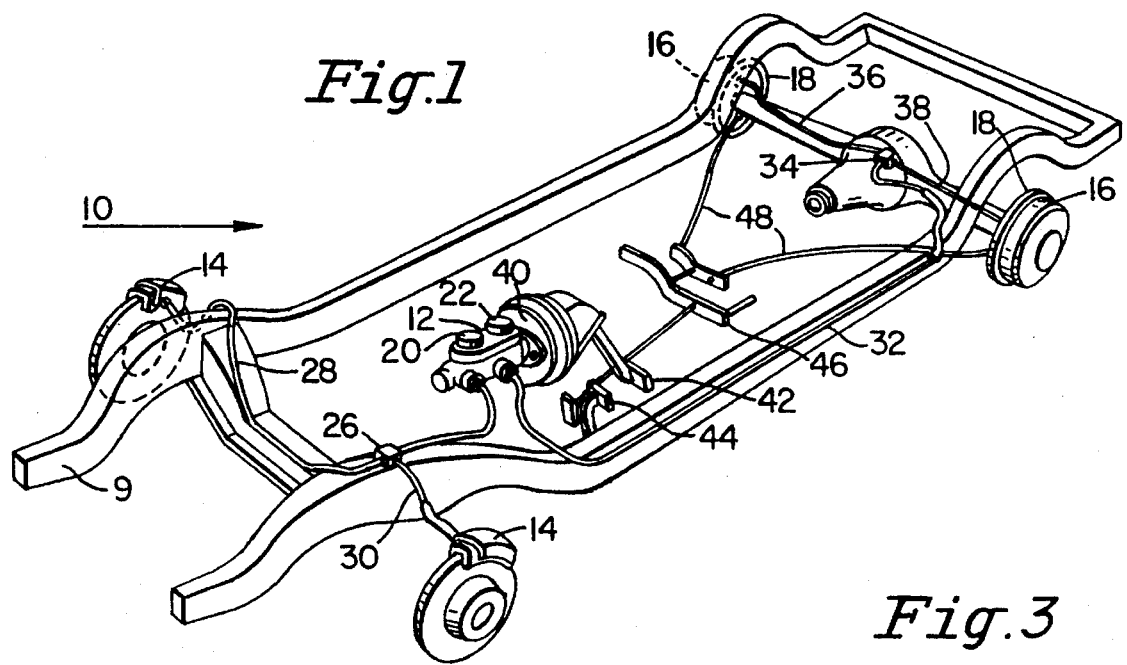
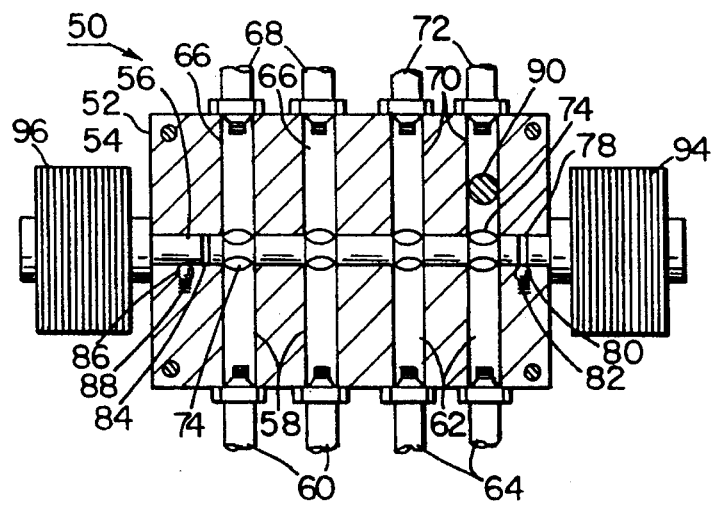

ANTI-THEFT SYSTEM FOR IMMOBILIZING A VEHICLE

BACKGROUND OF THE INVENTION

1. Field of the Invention

The present invention relates to an anti-theft system for vehicles, and more particularly to an anti-theft system that operates to immobilize a vehicle both by maintaining the hydraulic brakes of a stationary vehicle in an engaged condition and by disabling various parts of the vehicle electrical systems, to prevent unintended movement of the vehicle by an unauthorized person.

2. Description of the Related Art

Various types of structural arrangements for preventing theft of and unauthorized use of a vehicle are known. Several such arrangements have been suggested over the years, and examples of arrangements that are now in use include steering wheel locks, to prevent turning of the steering wheel when the ignition key is removed, electronically operated door locking systems, and various types of vehicle alarm systems to provide either or both audible alarms and visual alarms, the latter usually in the form of flashing headlights. Steering wheel locks are universally provided as standard equipment on all modern passenger vehicles, while electronically operated door locking systems and alarm systems are provided as standard equipment on only some of such vehicles. None of the devices that are presently available commercially has successfully prevented vehicle theft when they are confronted by a resourceful and determined thief.

The sales of vehicle alarm systems have increased significantly in recent years. However, that type of system places principal reliance upon either the deterrent effect on a thief of an audible alarm or of a visible alarm, which often does not have the desired deterrent effect, or, alternatively, on the intervention by a third party, such as a bystander, to intervene to help prevent the theft of the vehicle. However, third parties, including bystanders, often fear involvement in such activities, and more often than not they decline to intervene. Consequently, even vehicle alarm systems provide no guarantee against vehicle theft.

Because of the shortcomings of existing theft prevention arrangements and systems, some system for automatically and completely immobilizing a vehicle by the vehicle operator presents the most feasible way of preventing vehicle theft or unauthorized use, one that does not rely on audible or visual deterrents or on third party intervention. In that regard, several vehicle immobilization systems that include brake system lockup have been proposed in the past. Examples of such systems are disclosed in U.S. Pat. No. 3,684,049, which issued on Aug. 15, 1972, to Seiji Kimura; U.S. Pat. No. 3,800,279, which issued on Mar. 26, 1974, to Herbert L. Thompson; U.S. Pat. No. 4,018,314, which issued on Apr. 19, 1977, to Raymond Richmond, et al.; U.S. Pat. No. 4,196,939, which issued on Apr. 8, 1980, to George Kavis; U.S. Pat. No. 4,300,057, which issued on Nov. 10, 1981, to Pedro Batlle Crosas; U.S. Pat. No. 4,777,377, which issued on Oct. 11, 1988, to Herman C. Jeter; U.S. Pat. No. 4,951,776, which issued on Aug. 28, 1990, to Herman C. Jeter; U.S. Pat. No. 5,351,781, which issued on Oct. 4, 1994, to Chalmers A. Pritchard, et al.; and U.S. Pat. No. 5,413,197, which issued on May 9, 1995, to Larry G. Baer, et al. None of those systems, however, is in widespread use, and each has limitations that apparently contribute to its lack of broad scale acceptance.

It is an object of the present invention to provide an improved vehicle anti-theft system that operates both to block the vehicle brake system, to prevent vehicle movement, and also to disable elements of the vehicle electrical systems, to prevent unintended and unauthorized movement of the vehicle.

SUMMARY OF THE INVENTION

Briefly stated, in accordance with one aspect of the present invention, a vehicle security system is provided for preventing vehicle theft by immobilizing the vehicle. The system includes a first vehicle immobilization apparatus operable with a vehicle braking system for maintaining a vehicle brake in engaged condition for preventing vehicle movement, and a second vehicle immobilization apparatus operable with a vehicle electrical component provided for controlling engine operation, wherein the second vehicle immobilization apparatus disables operation of the electrical component for preventing engine operation.

In accordance with another aspect of the present invention, a method is provided for preventing unintended vehicle movement by immobilizing the vehicle. The method includes applying pressure to a vehicle hydraulic braking system to maintain the vehicle in a stopped condition, and thereafter blocking fluid communication between at least one wheel brake cylinder and a master cylinder to block the braking system in a brake engaged condition upon release of the applied pressure. The vehicle gearshift lever is moved into a position in which the vehicle is incapable of forward or reverse movement, and an electrical circuit of the vehicle is disabled to prohibit engine operation.

BRIEF DESCRIPTION OF THE DRAWINGS

FIG. 1 is a perspective diagrammatic view of a typical automotive hydraulically operated service brake system, incorporating a mechanically operated parking brake system.

FIG. 2 is an elevational, cross-sectional view through a brake system blocking valve for use in a vehicle anti-theft system in accordance with the present invention, operable for blocking hydraulic communication between parts of a vehicle hydraulic braking system.

FIG. 3 is a right end view of the blocking valve shown in FIG. 2.

DESCRIPTION OF THE PREFERRED EMBODIMENTS

Figure 4A:
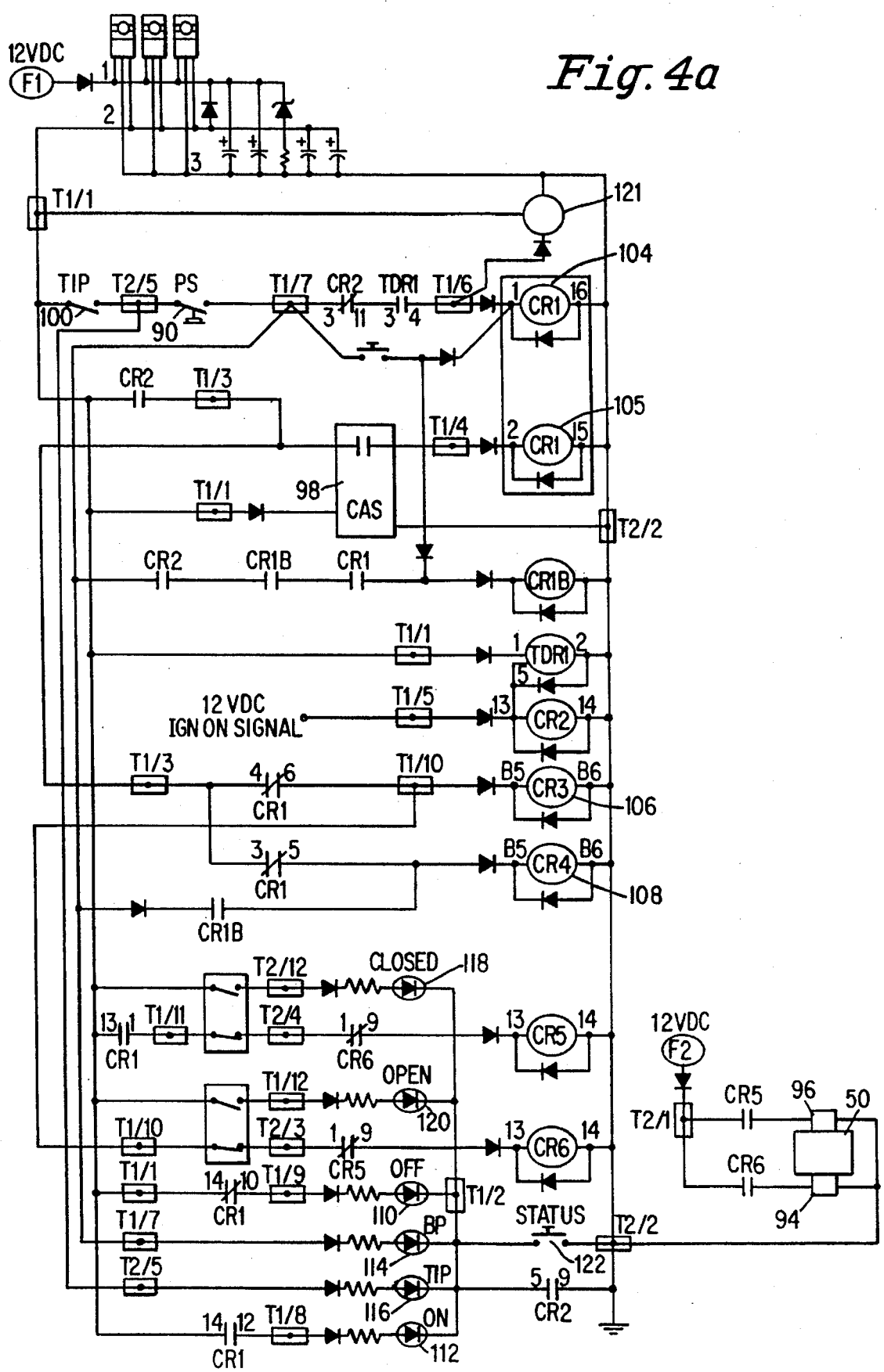
FIGS. 4a and 4b are circuit diagrams for a vehicle having an automatic transmission and a vehicle having a manual transmission, respectively, showing one form of electrical circuit that can be provided for controlling and actuating a vehicle anti-theft system in accordance with the present invention, and incorporating a blocking valve of the type shown in FIGS. 2 and 3.

Referring now to the drawings, and particularly to FIG. 1 thereof, there is shown an automobile frame 9, and a typical vehicle hydraulic service brake system 10 for an automobile. As shown, service brake system 10 is a typical modern day automobile braking system that incorporates a disc brake at each front wheel and a drum brake at each rear wheel.

Service brake system 10 includes a brake master cylinder 12 containing a reservoir for hydraulic fluid, a pair of front wheel brake cylinders (not shown) carried within front disc brake calipers 14, and a pair of rear wheel brake cylinders (not shown) carried between rear wheel brake drums 16 and rear wheel backing plates 18, and mounted to backing plates 18, as will be appreciated by those skilled in the art. Master cylinder 12 is a dual cylinder housing that includes a first master cylinder 20 for the front brakes and a second master cylinder 22 for the rear brakes.

Extending from first master cylinder 20 is a first hydraulic conduit 24 that terminates at a front junction block 26. A pair of front wheel cylinder conduits 28, 30 extend from front junction block 26 to respective ones of front disc brake calipers 14 to convey hydraulic pressure from first master cylinder 20 to each of the front wheel cylinders housed within front calipers 14. Similarly, extending from second master cylinder 22 is a second hydraulic conduit 32 that terminates at a rear junction block 34. A pair of rear wheel cylinder conduits 36, 38 extend from rear junction block 34 through respective ones of rear backing plates 18 to convey hydraulic pressure from second master cylinder 22 to the rear wheel cylinders mounted on each of backing plates 18.

Other elements of the braking system shown in FIG. 1 include a vacuum booster 40, to provide power assist for brake operation, and a foot operated brake pedal 42 for operating the hydraulic portion of the service brake system shown. Additionally, a parking brake system is also shown, and includes a parking brake pedal 44 that is connected with a relay lever 46 to mechanically actuate the rear brake shoes (not shown) through parking brake cables 48 by drawing the rear brake shoes against the respective brake drums.

The present invention provides for blocking the wheels of a vehicle, through the hydraulic service brake system, as one means for immobilizing the vehicle to prevent theft or unintended vehicle movement. Wheel blockage is provided by a blocking valve 50, shown in FIGS. 2 and 3, that is positioned in the hydraulic service brake system of a vehicle and is operable to maintain hydraulic pressure on each of the wheel cylinders to lock both the front and rear brakes in engaged condition. As shown, blocking valve 50 includes four brake fluid inlets and four brake fluid outlets, to accommodate individual brake conduit paths from master cylinder 12 to each of the four wheel cylinders. However, as will be appreciated by those skilled in the art, a single hydraulic fluid inlet and a single hydraulic fluid outlet can be provided for the front brakes, and a separate single hydraulic fluid inlet and a single hydraulic fluid outlet can be provided for the rear brakes, if desired, to accommodate valve 50 to the braking system elements and structure illustrated in FIG. 1.

Referring now to FIGS. 2 and 3, blocking valve 50 includes a generally rectangular housing 52 that has a substantially centrally positioned, longitudinally extending circular throughbore 54 to slidably receive a cylindrical valve spool 56. A pair of first hydraulic fluid inlet passageways 58 communicate with respective first hydraulic inlet pressure conduits 60 that each extend from first master cylinder 20, and a pair of second hydraulic fluid inlet passageways 62 communicate with respective second hydraulic inlet pressure conduits 64 from second master cylinder 22. In that regard, as herein described, the service brake system in which blocking valve 50 is incorporated has individual brake fluid conduits for each wheel, wherein four individual conduits extend from the master cylinder to valve 50, and four individual conduits extend from valve 50 to the respective individual wheels. Those skilled in the art will appreciate that a single inlet and single outlet for the front brakes and a single inlet and a single outlet for the rear brakes can also be provided, to adapt valve 50 for incorporation into a service brake system having the configuration shown in FIG. 1.

Valve housing 52 includes a pair of first fluid outlet passageways 66 that communicate with respective front wheel hydraulic pressure conduits 68 that extend from valve housing 52 to respective front wheel cylinders (not shown) housed within respective front wheel disc brake calipers 14. Similarly, valve housing 52 includes a pair of second fluid outlet passageways 70 that communicate with respective rear wheel hydraulic pressure conduits 72 that extend from housing 52 to respective rear wheel cylinders (not shown) carried on backing plates 18. As shown in FIG. 2, inlet passageways 58 and outlet passageways 66 are preferably aligned with each other and extend from the exterior of valve housing 52 to intersect with throughbore 54. Inlet passageways 62 and outlet passageways 70 are similarly aligned with respect to each other and also extend from the exterior of valve housing 52 to intersect with throughbore 54.

Communication between the respective opposed inlet and outlet passageways is selectively and simultaneously blocked and unblocked by cylindrical valve spool 56, which includes four circumferential grooves 74 that are longitudinally spaced from each other along the longitudinal axis of valve spool 56 at the same spacing as inlet passageways 58, 62 and as outlet passageways 66, 70. Communication between each of the inlet passageways and their respective outlet passageways is permitted when grooves 74 are aligned with the respective inlet and outlet passageways. Communication between each of the inlet passageways and their respective outlet passageways is blocked when valve spool 56 is shifted longitudinally within throughbore 54 so that grooves 74 are shifted out of alignment with the respective inlet and outlet passageways. A first spool locking detent arrangement for retaining valve spool 56 in position so that groves 74 are aligned with the respective inlet and outlet passageways, to permit fluid communication therebetween, is defined by a first annular groove 78 formed in valve spool 56. A cooperating first detent ball 80 that is spring biased for movement toward valve spool 56 by spring 82 is received within a transverse recess formed in housing 52 at one end thereof. Similarly, a second spool locking detent arrangement for retaining valve spool 56 in position when each of groves 74 is shifted relative to the respective inlet and outlet passageways, to prevent fluid communication therebetween, is defined by a second annular groove 84 formed in valve spool 56. A cooperating second detent ball 86 that is spring biased for movement toward valve spool 56 by spring 88 is received within a transverse recess formed in housing 52 at the opposite end thereof from first detent ball 80.

Also carried by valve housing 52 is pressure switch 90 that is received in a bore 92 formed in housing 52 and positioned transversely of the inlet and outlet passageways to communicate with one of outlet passageways 70. Switch 90 is responsive to the hydraulic pressure within one of the hydraulic brake fluid conduits 72 that communicates with one of the rear wheel cylinders, to sense when the hydraulic pressure within that conduit exceeds a predetermined pressure level indicative of brake actuation. In that regard, the preferred switch is a switch suitable for brake fluid service that incorporates normally open switch contacts, and that can operate from power supplied by a 12 volt DC power source. The preferred switch has contacts that are set to close when hydraulic pressure exceeds about 600 psig. and that are set to open when hydraulic pressure falls below about 400 psig. Although only a single pressure switch is shown, two pressure switches can be provided, if desired, each in fluid communication with one of the rear brake fluid circuits, and if provided they preferably are electrically connected in series so that both switches are required to exceed the set pressure limit and thereby require each of the switches to be closed in order to complete a circuit to provide a signal to be utilized as hereinafter described. Additionally, if the braking system includes a separate hydraulic conduit from the master cylinder to each rear wheel cylinder, separate, electrically series connected, pressure switches can be provided for each such conduit.

Actuation of valve spool 56 of blocking valve 50 between its blocked and its open positions is accomplished by energization of one of a pair of toroidal coils 94, 96 of wire that are positioned at a respective longitudinal end of valve housing 52. Each of coils 94, 96 is of such a size as to surround the open ends of throughbore 54 and to slidably receive a cylindrical spool extension defining a solenoid. Consequently, extending from each end of valve spool 56 are respective solenoids that are received within a respective coil at each end of valve housing 52 to allow controlled movement of valve spool 56 within throughbore 54.

When a coil is energized, valve spool will 56 shift laterally within throughbore 54 either to block fluid communication between respective inlet and outlet passageways, or, alternatively, to permit fluid communication between respective inlet and outlet passageways. As illustrated in FIG. 2, valve spool 56 is in its unblocked position, with annular grooves 74 aligned with the fluid inlet and outlet passageways to permit fluid communication between the fluid inlet passageways and the fluid outlet passageways. In that position, coil 94 has been energized to draw valve spool 56 to the position shown. After energization, of coil 94 is terminated, valve spool 56 remains in the unblocked position by virtue of the pressure provided by spring loaded ball 80, which presses against first annular groove 78 to hold valve spool 56 and thereby prevent unintended movement of valve spool 56 by retaining it in its unblocked position. Thus coil 94 is designated as the unblocking coil.

Similarly, coil 96 is the blocking coil and operates to draw valve spool 56 toward the left as viewed in FIG. 2, to cause the respective circumferential grooves 74 to move out of registry with the inlet and outlet flow passageways, to thereby block fluid communication therebetween. When shifted to the blocked position, valve spool 56 is retained in that position by the cooperative action of second annular groove 84 and second spring biased detent ball 86. Preferably, the annular retainer grooves 78, 84 in valve spool 56 and their associated spring biased detent balls 80, 86, respectively, are so configured that they permit axial movement of valve spool 56 only when one of coils 94 or 96 is energized. In that regard, the maximum differential pressure across valve 50 is about 2000 psig., and therefore the unblocking coil must be capable of shifting valve spool 56 when the spool is subjected to that pressure differential.

Figure 4B:
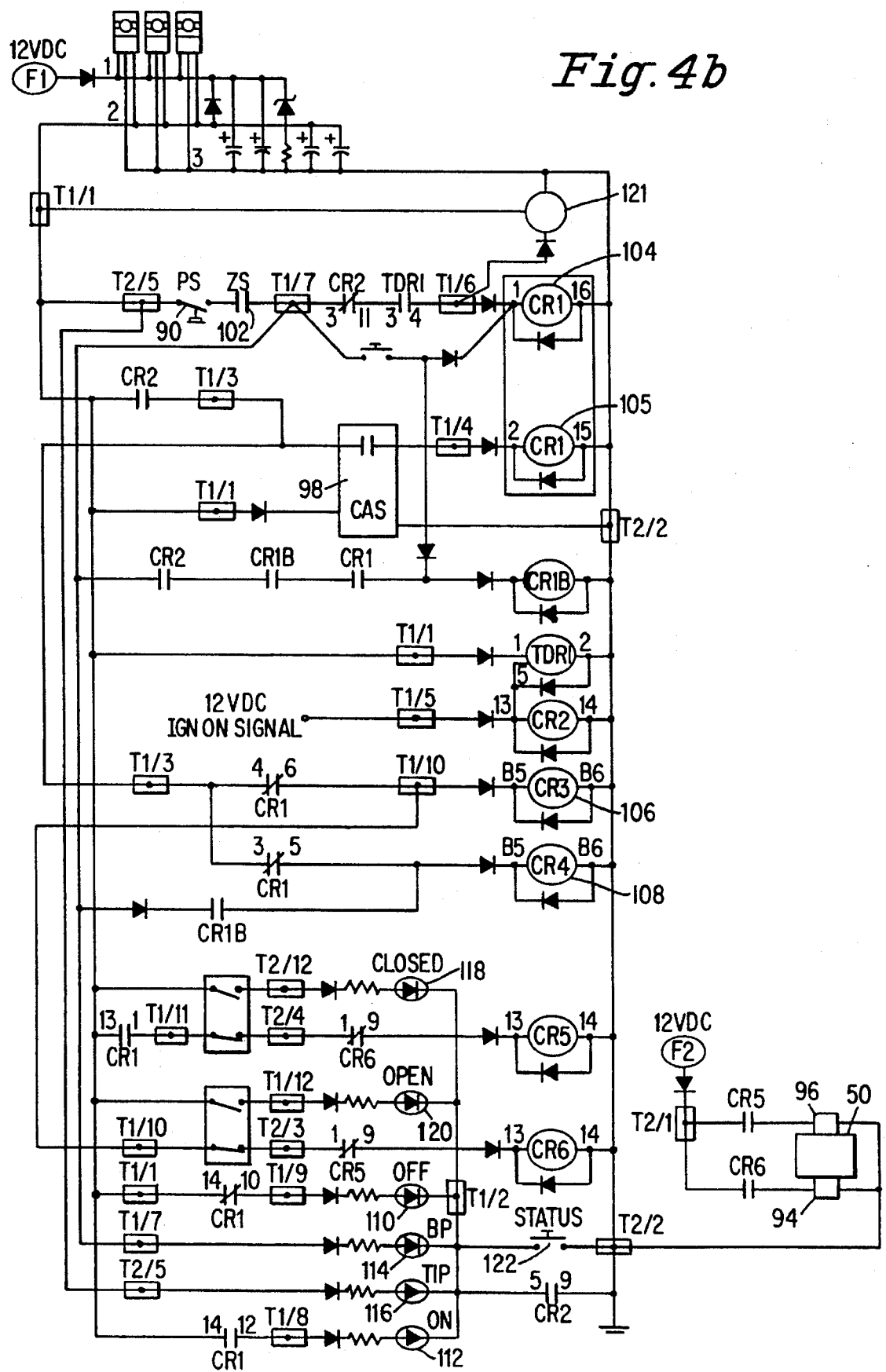

An electrical circuit suitable for use in connection with the present invention is shown in FIGS. 4a and 4b. A series of normally open switches is provided, each of which must be closed to permit activation of the system of the present invention. In that connection, a normally open transmission-in-park switch 100 is provided, as shown in FIG. 4a for a vehicle having an automatic transmission, which closes only when the shift lever of the vehicle automatic transmission is moved into the PARK position, to indicate that the vehicle is stopped. As shown in FIG. 4b for a vehicle having a manual transmission, transmission-in-park switch 100 is replaced with a normally open zero speed switch 102, which senses rotation of a wheel, or of the drive shaft of the vehicle, and which is adapted to be closed when the vehicle is stopped. In the same leg of the circuit as either transmission-in-park switch 100 or zero speed switch 102 is normally open brake pressure switch 90, which is closed when the hydraulic pressure to which it is subjected exceeds about 600 psig., which is indicative of brake actuation. When each of the series-connected switches 90 and 100 or 102 are closed, the vehicle is stopped and the brake system has been actuated, thereby closing the circuit to permit blocking valve 50 to be placed in the blocked condition through activation of locking relay 104, which energizes coil 96 (see FIG. 2) so that hydraulic communication between the individual wheel hydraulic cylinders and the master cylinder is prevented, and thereby the brakes are locked in the engaged condition. Unlocking of the brakes is effected through activation of unlocking relay 105, which energizes coil 94 (FIG. 2) to permit hydraulic fluid communication between the individual wheel brake cylinders and the associated master cylinder.

At the time the system is energized and the brakes are locked in the engaged condition, starter interlock relay 106 is activated to open the starter circuit, which prevents starter operation. Similarly, ignition coil interlock relay 108 is also activated, to open the ignition circuit. Thus, in addition to locking the brakes, the present invention also disables both the starter and the ignition coil from operation. Although both starter and ignition circuits are included in the circuit shown in FIG. 4, if desired only one of those circuits can be included.

The circuit shown in FIG. 4 also includes several indicator lights, which can be light emitting diodes, that are provided to show the status of the system. Light 110 when illuminated indicates the brake locking system is off; light 112 when illuminated indicates the brake locking system is on; light 114 when illuminated indicates that brake hydraulic pressure is sufficient to cause the contacts of brake pressure switch 90 to close; and light 116 when illuminated indicates that the shift lever is in park, when the vehicle is one having an automatic transmission, or that the vehicle is stopped, when the vehicle is one having a manual transmission. The position of blocking valve is indicated by light 118, which when illuminated indicates that blocking valve 50 is closed, and by light 120, which when illuminated indicates that block valve 50 is open. A status pushbutton 122 is provided to show the system condition only when the vehicle ignition switch is in the OFF position; otherwise the status pushbutton is not necessary because the system status is automatically displayed when the ignition switch is in the ON position. System activation pushbutton 136 is provided to initiate system activation by the vehicle operator.

A momentarily operable audible indicator 121, such as a chime or a buzzer, can be provided to indicate that the system is being activated to immobilize the vehicle. And a coded access system 98 in the form of an alphanumeric keypad is provided to disable the system by the entry of a predetermined deactivation code.

Figure 5:
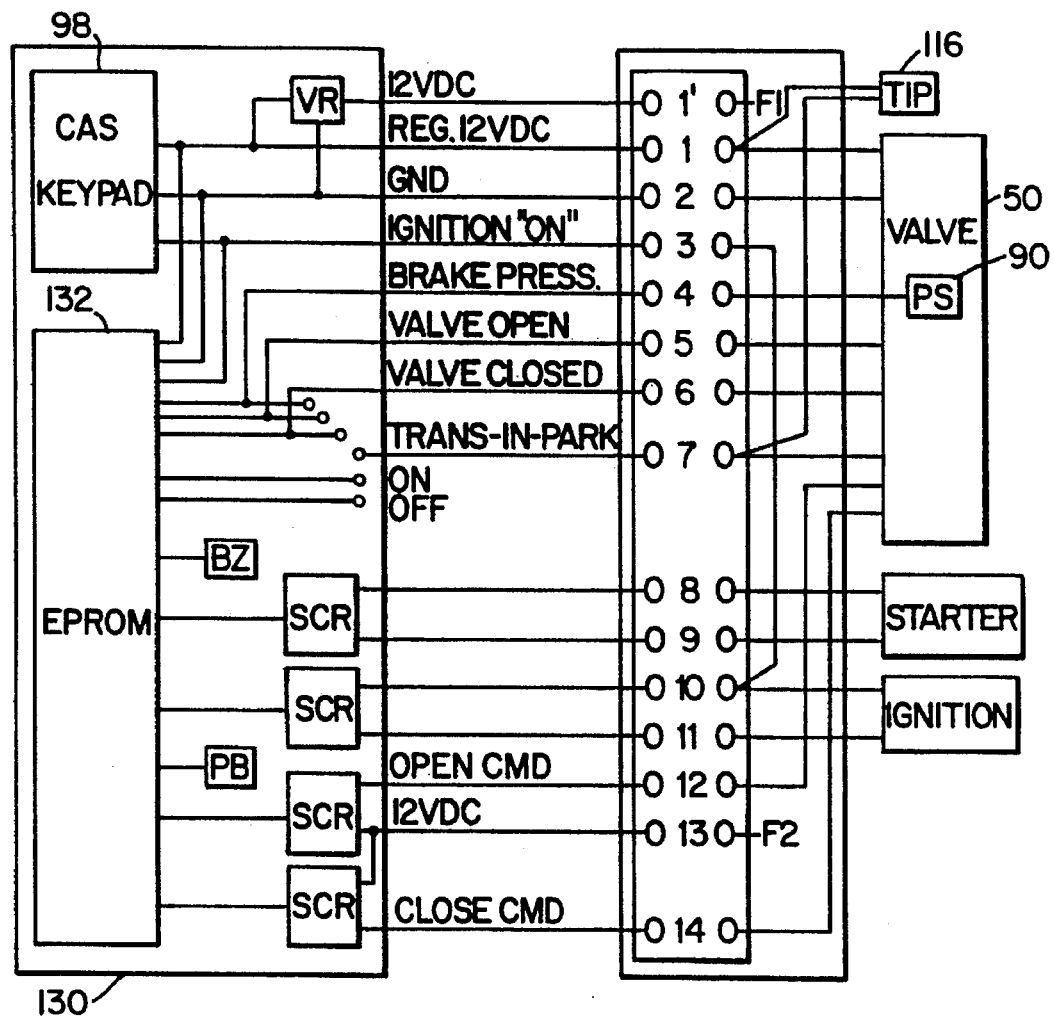
FIG. 5 is a schematic diagram showing a terminal block and associated connections for use with the circuit shown in FIG. 4.

FIG. 5 shows a terminal block 124 to provide an interface between the several mechanical and electrical components of the vehicle and a control system 130 in accordance with the present invention, which includes a logic eprom 132. Blocking valve 50, pressure switch 90, and transmission-inpark switch 116 are shown on one side of terminal block 124, along with, in block diagram form, starter circuit 126 and ignition circuit 128. The electrical elements of the present system, shown in circuit form in FIG. 4, are shown in block diagram form in FIG. 5 as part of control system 130. The terminals shown in FIG. 5 correspond with those indicated in FIG. 4.

Figure 6:
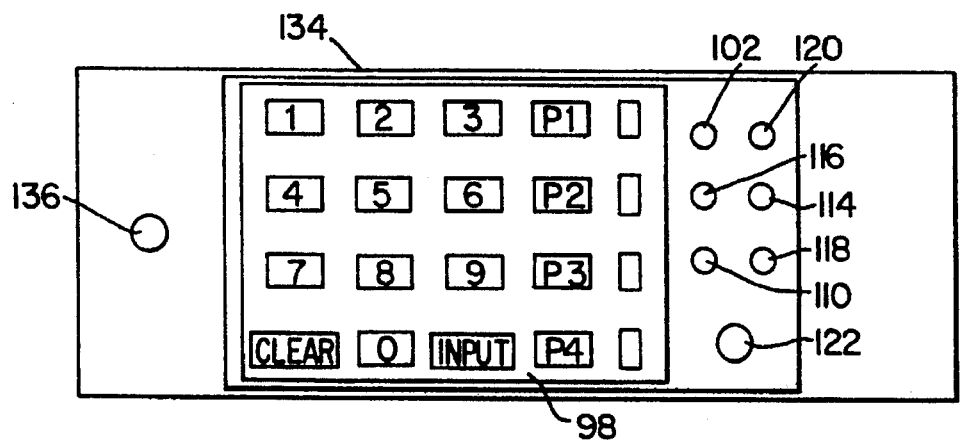
FIG. 6 is an elevational view of one form of dashboard-mounted control panel layout suitable for use with a vehicle anti-theft system in accordance with the present invention.

FIG. 6 shows one form of control panel 134 that can be provided as a part of the system of the present invention to display the status of the system and of several of its parts, as well as to permit vehicle operator intervention and control. Panel 134 includes alphanumeric keypad 98, as well as indicator lights 102, 110, 114, 116, 118, and 120. Additionally, status pushbutton 122 is included to show system status when the ignition switch is in the OFF position, and system activation pushbutton 136 is included to initiate system activation.

In operation, the system in accordance with the present invention functions automatically to lock the front and rear brakes, to disable the starter by providing an open circuit condition in the starter circuit, and to disable the ignition coil by providing an open circuit condition in the ignition circuit. Automatic activation of the system together with engine shutdown is achieved by bringing the vehicle to a complete stop and placing the transmission selector lever in the PARK position, as a result of which transmission-in-park indicator light 116 is illuminated. Foot pressure is then applied to the service brake pedal at a pressure level sufficient to illuminate brake pressure indicator light 114, and that foot pressure is maintained until the ignition switch is switched to the OFF-LOCK position, at which time the system is automatically engaged, and status of the system as engaged can be verified by pressing status pushbutton 118 on control panel 134 (see FIG. 6). Engagement of the system constitutes blocking of vehicle movement as a result of locking the service brake in the brake engaged condition, as a result of disabling of the starter by providing an open circuit condition in the starter circuit, and as a result of disabling the ignition coil by providing an open circuit condition in the ignition circuit.

Deactivation of the system while the engine is not running is accomplished by inserting the ignition key into the ignition switch and turning the switch to the RUN position. The following indicator lights on control panel 134 will illuminate: on light 112, brake pressure light 114, and transmission-in-park light 116. The access control code is entered by pressing the appropriate buttons on keypad 98, after which on light 112 and brake pressure light 114 will both be extinguished. Simultaneously, off indicator light 110 will illuminate. When the transmission lever is moved out of the PARK position, transmission-in-park light 116 will be extinguished. Normal vehicle operation can then be resumed.

If it is desired to activate the system while maintaining the engine in operation, a similar procedure is followed as in the automatic operation described above. The vehicle must first be brought to a complete stop, after which the transmission lever is placed in the PARK position. Foot pressure is then applied to the service brake pedal at a pressure level sufficient to illuminate brake pressure indicator light 114, and that foot pressure is maintained until system activation pushbutton 136 (see FIG. 6) is pressed, at which time the system is engaged to prevent vehicle movement by locking the service brakes in the engaged condition, although the ignition circuit is not disabled when the system is in the engine running mode. The system will remain engaged and the engine will continue to run until the shift lever is moved out of the PARK position, at which time the engine will automatically shut down as a result of the system disabling the ignition coil by causing an open circuit condition in the ignition circuit. The system will be engaged and will result in blocking of vehicle movement as a result of locking the service brake in the brake engaged condition, as a result of disabling of the starter by providing an open circuit condition in the starter circuit, and as a result of disabling the ignition coil by providing an open circuit condition in the ignition circuit. Disengagement of the system is effected by entering the predetermined deactivation code by pressing the appropriate buttons on keypad 98.

Deactivation of the system while the engine is running is accomplished by entering into the system the access control code by pressing the appropriate buttons on keypad 98, after which on light 112 and brake pressure light 114 will both be extinguished. Simultaneously, off indicator light 110 will illuminate. When the transmission lever is moved out of the PARK position, transmission-in-park light 116 will be extinguished. Normal vehicle operation can then be resumed.

It is therefore apparent that the system of the present invention engages automatically with minimal operator effort, utilizing the normal operator activities that are performed each time a vehicle is positioned for temporary storage. Additionally, a further advantage of the present system derives from the fact that the system will remain engaged and is unaffected by removal of the vehicle battery, thereby providing a further impediment to a thief or other unauthorized user of the vehicle.

Optionally, instead of disabling the ignition coil, if the vehicle incorporates an electronically controlled and operated fuel injection system, that system can be disabled by providing an open circuit condition in the control circuit, similar to that herein disclosed in connection with the ignition circuit, to prevent unintended engine operation by preventing fuel flow to the engine.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A vehicle security system for preventing unintended vehicle movement by immobilizing the vehicle, said system comprising:

a. a pressurized-fluid-operated vehicle braking system carried by the vehicle for arresting motion of wheels on which the vehicle is supported for movement;

b. a normally open blocking valve positioned in the vehicle braking system between a braking fluid reservoir and at least one wheel brake actuator for blocking flow of braking fluid from the at least one wheel brake actuator to the braking fluid reservoir;

c. a vehicle stopped sensor carried by the vehicle for providing a signal indicative of a vehicle at rest condition;

d. a pressure sensor positioned in the vehicle braking system between the at least one wheel brake actuator and the blocking valve for providing a braking fluid pressure signal; and e. control means carried by the vehicle and responsive to the signal from the vehicle stopped sensor and to the braking fluid pressure signal for enabling operation of the blocking valve when the vehicle is at rest and when the braking fluid pressure signal exceeds a predetermined pressure level.

2. A vehicle security system in accordance with claim 1 including vehicle engine immobilization means operable with a vehicle electrical component provided for operation of an engine carried by the vehicle, wherein the vehicle immobilization means disables operation of the electrical component for preventing engine operation.

3. A vehicle security system in accordance with claim 2 wherein the vehicle engine immobilization means includes means for disabling a vehicle starter provided for starting the vehicle engine.

4. A vehicle security system in accordance with claim 2 wherein the vehicle engine immobilization means includes means for disabling operation of a vehicle ignition system that is provided for igniting a fuel-air mixture supplied to the engine.

5. A vehicle security system in accordance with claim 4 wherein the ignition system includes an ignition coil, and the second immobilizing means disables operation of the ignition coil.

6. A vehicle security system in accordance with claim 2 wherein the vehicle engine immobilization means includes means for disabling operation of a vehicle electronic fuel control system.

7. A vehicle security system in accordance with claim 2 wherein the vehicle engine immobilization means includes means for disabling a vehicle engine starter provided for starting the vehicle engine.

8. A vehicle security system in accordance with claim 7 wherein the vehicle engine immobilization means also includes means for disabling operation of a vehicle ignition system that is provided for igniting a fuel-air mixture supplied to the engine.

9. A vehicle security system in accordance with claim 8 wherein the vehicle engine immobilization means also includes means for disabling operation of a vehicle electronic fuel control system carried by the vehicle.

10. A vehicle security system in accordance with claim 1 including means for deactivating the security system to restore the vehicle to operable and movable condition, the deactivation means including coded access means for permitting manual entry of a predetermined coded signal for providing a deactivation signal for deactivating the security system.

11. A vehicle security system in accordance with claim 1 wherein the blocking valve includes a valve housing having a plurality of fluid inlets and a plurality of associated fluid outlets, a bore within the housing passing through passageways interconnecting the respective fluid inlets and fluid outlets, and a valve spool slidably received within the bore, the valve spool having longitudinally spaced circumferential recesses corresponding in number at least with the number of inlets, the circumferential recesses adapted to permit fluid communication between respective fluid inlets and fluid outlets, whereby sliding movement of the valve spool within the bore selectively permits and blocks fluid communication between the respective inlets and outlets.

12. A vehicle security system in accordance with claim 11 including retention means for retaining the valve spool in a predetermined position.

13. A vehicle security system in accordance with claim 12 wherein the retention means includes a recess formed in the valve spool and a detent ball carried in the valve housing and spring biased into surface contact with the valve spool.

14. A vehicle security system in accordance with claim 11 wherein the valve housing includes a normally open pressure switch having switch contacts that close in response to a predetermined pressure increase.

15. A vehicle security system in accordance with claim 11 including valve spool actuating means for shifting the valve spool within the bore from a fluid communication blocking position to a fluid communication unblocking position.

16. A vehicle security system in accordance with claim 15 wherein the valve spool actuating means includes a solenoid connected with the valve spool and a coil adjacent the solenoid for shifting the valve spool.

17. A vehicle security system in accordance with claim 1 wherein the vehicle stopped sensor provides a signal indicative of a vehicle automatic transmission having gears arranged in a non-driving, park position.

18. A vehicle security system in accordance with claim 1 wherein the vehicle stopped sensor provides a signal indicative of a vehicle manual transmission having gears arranged in a non-driving, neutral position.

* * * * *